United States Patent [19]

Hushebeck

[11] 4,098,719

[45] Jul. 4, 1978

[54] POLYVINYL CHLORIDE SOLVENT WELD PRIMER COMPOSITION

[75] Inventor: Henry R. Hushebeck, North Wales, Pa.

[73] Assignee: Certain-Teed Corporation, Valley Forge, Pa.

[21] Appl. No.: 779,273

[22] Filed: Mar. 18, 1977

Related U.S. Application Data

[63] Continuation-in-part of Ser. No. 713,647, Aug. 12, 1976, abandoned.

[51] Int. Cl.² .............................................. B01F 1/00
[52] U.S. Cl. .................................... 252/364; 156/294; 156/296
[58] Field of Search ................. 252/364; 156/296, 294

[56] References Cited

U.S. PATENT DOCUMENTS

| | | | |
|---|---|---|---|
| 3,706,691 | 12/1972 | Duffy et al. | 252/364 |
| 3,846,332 | 11/1974 | Croix | 252/364 |

*Primary Examiner*—Stephen J. Lechert, Jr.
*Attorney, Agent, or Firm*—Paul & Paul

[57] ABSTRACT

An improved solvent welding primer is described for use particularly in the assembly of polyvinyl chloride pipe and fittings to themselves or polyvinyl chloride pipe or fittings to acrylonitrile-butadiene-styrene pipe or fittings. The primer consists essentially of an organic solvent containing an amount within the range of from about 0.5 percent by weight to about 2.5 percent by weight of an unplasticized polyvinyl chloride resin dissolved in the solvent. The solvent is a mixture of tetrahydrofuran and dimethylformamide having a weight ratio of THF to DMF within the range of from about 1.64:1 to 1:1.

2 Claims, No Drawings

POLYVINYL CHLORIDE SOLVENT WELD PRIMER COMPOSITION

CROSS-REFERENCE TO RELATED APPLICATION

This application is a continuation-in-part of applicant's copending application Ser. No. 713,647, filed Aug. 12, 1976, now abandoned.

BRIEF SUMMARY OF THE INVENTION

With the advent of plastic pipe and fittings as acceptable replacement for metallic and ceramic materials, new methods of joining such components have been developed. One such method of joining polyvinyl chloride (PVC) to itself or to acrylonitrilebutadiene-styrene (ABS) is the use of solvent welds following the recommended practices in ASTM D-2855 for PVC to PVC joints, and ASTM D-3138 for PVC to ABS. PVC resin requirements are listed in ASTM D-1784. Solvent cements are covered in ASTM 2564 for PVC, and for PVC to ABS in ASTM D-3138. All these ASTM references are incorporated herein by reference and made a part thereof.

Forming joints of PVC by solvent welding requires reasonable care. PVC pipe and sockets are made by extrusion of hollow tubes of the PVC composition for a desired end use. Sockets are made on the end of a length of pipe by expanding one end with a die under heat and pressure which also imparts a slight taper on the socket bore to enable the pipe nose to be inserted and pushed down to an interference fit enabling the solvent welding materials, i.e., primer and solvent cement, to form a sealing bond between the pipe nose and socket.

With the production speeds required today to produce an economically competitive PVC pipe product line, processing conditions of heat and pressure have been intensified to a point where the surfaces of the pipe and particularly sockets have become highly compressed and less susceptible to solvent attack, and in most cases, particularly for pressure uses, primers are mandatory for usable solvent weld joints. The primers, when applied to the part surfaces both penetrate and dissolve the coated area of the respective parts. The sockets, since they have been subjected to additional heat and pressure are very difficult to solvate sufficiently to form a leakfree joint. In addition, with presently available commercial primers, it is almost impossible to keep the pipe and socket in a consistent state of solvation long enough to complete a satisfactory joint in reasonable time under ambient conditions of temperature, wind and humidity in the field. This problem is aggravated as pipe diameters increase. Completed lines were subject to leakage before and after trench burial resulting in costly claims and repairs and loss of customers. Considerable other problems have arisen in actual practice when making solvent welded joints, such as the necessity of keeping the mating surfaces clean and dry while forming the joint. Moreover, since the presently available primers are composed of pure solvent, runs and sags of the primer coating occur causing uneven distribution and solvation of the welded elements. This leads to voids in the joint, starved welds and poor bonds which ultimately causes leaks in joints during line testing or actual service.

The presently claimed invention was effected to overcome these deficiencies which have been overcome in actual field trials and in commercially fabricated pipe lines under various ambient conditions with temperatures from 40° F to 110° F, 100% humidity and strong winds of 30–40 mph.

It is therefore an object of this invention to provide a novel composition for ensuring the formation of improved solvent welded joints in plastic pipe construction.

The object of this invention has been achieved by the discovery of an improved solvent welding primer composition consisting essentially of (1) an amount within the range of from about 0.5 percent by weight to about 2.5 percent by weight of polyvinyl chloride homopolymer having an inherent viscosity of 0.80 – 0.95 and a specific gravity of 1.4 in solution in (2) a solvent mixture consisting essentially of tetrahydrofuran (THF) and dimethylformamide (DMF), the weight ratio of THF to DMF being within the range of from about 1.65:1 to 1:1. The preferred ratio is 1.11 THF:1.0 DMF. All ratios tested were found to give much better field performance than presently available commercial primers.

While use of cyclohexanone has been suggested in some of the ASTM specifications previously listed, it has been found that it has a tendency to have poorer release from the fabricated joints and cause excessive internal solvation resulting in weakening of the joint parts and is not considered as acceptable.

EXAMPLES 1-5 (% BY WEIGHT)

The following are suitable solvent welding primer compositions for use with polyvinyl chloride pipe:

| Ingredients | Example 1 | 2 | 3 | 4 | 5 |
| --- | --- | --- | --- | --- | --- |
| Tetrahydrofuran | 51.7 | 51.2 | 52.2 | 64.1 | 49.3 |
| Dimethylformamide | 46.8 | 46.3 | 47.3 | 34.4 | 49.2 |
| PVC homopolymer, (inherent visc. 0.90–.95) | 1.5 | X | X | X | 1.5 |
| PVC homopolymer, (inherent visc. 0.80) | X | 2.5 | X | X | X |
| PVC homopolymer, (inherent visc. 0.92–.98) | X | X | 0.5 | X | X |
| PVC homopolymer, (inherent visc. 0.87–.93) | X | X | X | 1.5 | X |

(PVC - polyvinyl chloride)

The normal application of the solvent welding primer compositions of this invention is to apply one coat thereof to the spigot of the joint and two coats to the socket. The spigot then receives one coat of a suitable solvent cement on top of the primer. Solvent cement is not applied to the socket. The joint is usually completely in sixty seconds or less depending on size and ambient temperature and humidity conditions.

While the preferred embodiments of the composition and process of this invention pertain to the solvent welding of polyvinyl chloride pipe, the scope thereof is intended to include the solvent welding of all thermoformed resin pipe systems by means of compatible resinated primers and solvent cements.

Having thus described my invention, I claim:

1. A solvent welding primer composition for joining thermoformed polyvinyl chloride pipe and fittings or for joining polyvinyl chloride elements to acrylonitrile-butadiene-styrene elements consisting essentially of an organic solvent consisting essentially of tetrahydrofuran and dimethylformamide, the weight ratio of tetrahydrofuran to dimethylformamide being within the range of from about 1.64:1 to 1:1, said solvent having dissolved therein an amount within the range of from about 0.5 percent by weight to about 2.5 percent by weight of polyvinyl chloride homopolymer having an inherent viscosity of 0.80–0.98.

2. The composition of claim 1, wherein the weight ratio of tetrahydrofuran to dimethylformamide is 1:11 to 1:0.

* * * * *